United States Patent [19]
Corrigan

[11] Patent Number: 5,532,978
[45] Date of Patent: Jul. 2, 1996

[54] METHOD OF CORRECTION OF SEISMIC DATA FOR THE EFFECTS OF AZIMUTHAL ANISOTROPY

[75] Inventor: Dennis Corrigan, Plano, Tex.

[73] Assignee: Atlantic Richfield Company, Los Angeles, Calif.

[21] Appl. No.: 171,727

[22] Filed: Dec. 22, 1993

[51] Int. Cl.$^6$ .............................. G01V 1/28; G01V 1/053
[52] U.S. Cl. .................. 367/75; 367/31; 364/421
[58] Field of Search .................. 367/31, 47, 73, 367/75; 364/421

[56] References Cited

U.S. PATENT DOCUMENTS

| | | | |
|---|---|---|---|
| 4,794,572 | 12/1988 | Lardergeld et al. | 367/75 |
| 5,027,332 | 6/1991 | Allford | 364/421 |
| 5,136,554 | 8/1992 | Thomsen et al. | 364/421 |
| 5,142,501 | 8/1992 | Winterstein | 367/75 |
| 5,214,613 | 5/1993 | Esmersoy | 367/57 |
| 5,343,441 | 8/1994 | Allford | 367/75 |
| 5,402,392 | 3/1995 | Lau et al. | 367/75 |

OTHER PUBLICATIONS

"3–D Seismic: Is the promise fulfilled?", E. O. Nestvoid, pp. 12–19, Geophysics: The Leading Edge of Exploration, Jun. 1992.

"Applications of New Recording Systems to 3–D Durvey Designs", G. A. Crews, et al., pp. 624–627, Expanded Abstracts of the 59th Annual SEG Meeting, Dallas, TX SA16.

"Application of New Seismic Acquisition Technology to Land 3–D Surveys:Implementation", J. A. Musser, et al., pp. 628–631, Expanded Abstracts of the 59th Annual SEG Meeting, Dallas, Texas, SA 17.

"Common Reflection Point Horizontal Data Stacking Techniques", W. H. Mayne, pp. 927–938, Geophysics, vol. XXVII, No. 6, Part II (Dec., 1962).

Primary Examiner—Nelson Moskowitz
Attorney, Agent, or Firm—Joseph E. Rogers

[57] ABSTRACT

A method for correction of seismic data for taking into account azimuthal anisotropy in the subsurface is described. The data is corrected using an azimuthally anisotropic normal moveout equation, thereby yielding better signal to noise ratio as well as providing valuable information as to the degree and direction of azimuthal anisotropy in the subsurface.

9 Claims, 4 Drawing Sheets

METHOD OF CORRECTION OF SEISMIC DATA FOR THE EFFECTS OF AZIMUTHAL ANISOTROPY

BACKGROUND OF THE INVENTION

1. Field of the Invention

This invention relates to an improved method for estimating seismic velocities used in generating seismic sections. More particularly, it pertains to a method for improving the signal to noise ratio of a stacked trace of common midpoint seismic data by accounting for the effects of azimuthal anisotropy.

2. Description of the Prior Art

Seismic prospecting methods record the reflection time of seismic signals imparted into the earth. The determination of the reflection depth, which is of ultimate importance to the prospector, depends on the correct estimation of the subsurface seismic velocities. One of the methods used to estimate this unknown velocity is to measure the difference in the time of receipt of a particular seismic reflection between one geophone and another. To the extent that reflection time predictably increases with distance between the source and each successive receiver, one has a good estimate of the subsurface velocity.

For approximately a half of century, the processing and interpretation of compressional wave data has proceded under the assumption of azimuthal isotropy, i.e., the velocity of compressional waves is assumed to be independent of the azimuth of the vertical plane containing the source and receiver. Using this assumption, it is well known that the relation between travel time and offset (the normal moveout) for a reflector recorded over an approximately horizontally layered earth by a collection of common midpoint traces is given by the simple formula:

$$T^2 = T_0^2 + \frac{r^2}{v^2}$$

where:

$T_o$=zero-offset travel time;

T=offset-dependent travel time;

r=source-receiver offset;

v=normal moveout velocity.

Note that the travel time is independent of trace azimuth.

During the past decade, however, three-dimensional (3D) seismology has become a routine technique for helping to solve problems of exploration and exploitation geophysics (Nestvold, 1992). While the common midpoint technique (Mayne, 1962) dictated the basic geometry of 2D seismic acquisition for three decades, the collection of 3D data is now accomplished using a variety of different approaches.

The very nature of 3D seismic data acquisition results in the data being collected along a variety of source receiver azimuths. Many 3D data acquisition techniques are relatively straightforward generalizations of well known 2D methods; examples include multi-streamer marine operations and in-line swath shooting on land. For these quasi-2D methods, traces in a common midpoint tend to be restricted to a narrow range of source-receiver azimuths and the offsets of the traces are strongly correlated with trace azimuths.

More advanced 3D data acquisition techniques (e.g., Crews, et al., 1989 and Musser, et al., 1989) provide data which contain a rich assortment of trace azimuths in a common midpoint. Furthermore, these azimuths are not strongly correlated with the trace offsets.

If the subsurface exhibits a significant degree of azimuthal anisotropy, conventional isotropic techniques for performing velocity analysis and normal moveout correction may fail to adequately account for the travel time behavior of recorded seismic data.

2D-data and 3D-data collected in a quasi-2D fashion may not be suitable for advanced analysis for the effects of azimuthal anisotropy because of the restricted range of trace azimuths available in a common midpoint gather. On the other hand, the collection of 3D data using the methods similar to those described in Crews and/or Musser, containing rich distributions of azimuths, can lead to greatly improved subsurface images and facilities a fundamentally new way of analyzing reflection seismic data for the effects of azimuthal anisotropy.

SUMMARY OF THE INVENTION

In accordance with the present invention, I have discovered A method for improving the signal to noise ratio of a stacked trace of common midpoint seismic data obtained over a surface area having a plurality of trace azimuths, which includes the steps of selecting a first gather of traces along a first one of the plurality of trace azimuths; selecting a second gather of traces along a second one of the plurality of trace azimuths; assuming a plurality of degrees of anisotropy; assuming a plurality of angular directions of the anisotropy; stacking of the first and second gathers of traces accounting for the anisotropy to produce a candidate stacked trace; measuring the total energy of the candidate stacked trace for each one of the plurality of degrees of anisotropy to determine a degree of anisotropy for which the energy is a maximum; and measuring the total energy of the candidate stacked trace at the degree of anisotropy for which the total energy of the candidate stacked trace is a maximum for a plurality of angles for direction of anisotropy to determine the angular direction of anisotropy for which the energy is a maximum thereby maximizing the signal to noise ratio of the stack and determining the degree of and angular direction of azimuthal anisotropy.

Another embodiment of my invention includes the steps of selecting a first gather of traces along a first one of the plurality of trace azimuths; selecting a second gather of traces along a second one of the plurality of trace azimuths; assuming a plurality of degrees of anisotropy; assuming a plurality of angular directions of the anisotropy; stacking of the first and second gathers of traces accounting for the said anisotropy to produce a candidate stacked trace; measuring the total energy of the candidate stacked trace for each one of the plurality of degrees of anisotropy and for a plurality of angles for direction of anisotropy to determine the angle and degree of anisotropy for which the energy is a maximum thereby maximizing the signal-to-noise ratio of the stack and determining the degree of and angular direction of azimuthal anisotropy.

The anisotropic analysis procedure outlined above leads directly to estimates of the direction and degree of anisotropy as functions of the subsurface location of the anisotropy. This information has the potential for helping to define such parameters of geologic interest such as the direction and extent of subsurface fraction systems, quantities which are difficult to estimate from conventional analysis of compressional wave data.

In addition, while this method is valid for horizontally layered media, both the isotropic and the azimuthally anisotropic travel time curves can be generalized to the case in which the reflector has an arbitrary subsurface dip. Thus, the standard techniques such as dip-moveout and migration which have been developed to improve the imaging of dipping beds can be generalized to incorporate the effects of azimuthal anisotropy.

DESCRIPTION OF THE PREFERRED EMBODIMENT

My invention can best be understood by referring to the above described figures in conjunction with the detailed description below. The same or similar identifying numbers or letters will be used throughout to refer to the same or similar elements in each of the figures.

Figure 1:
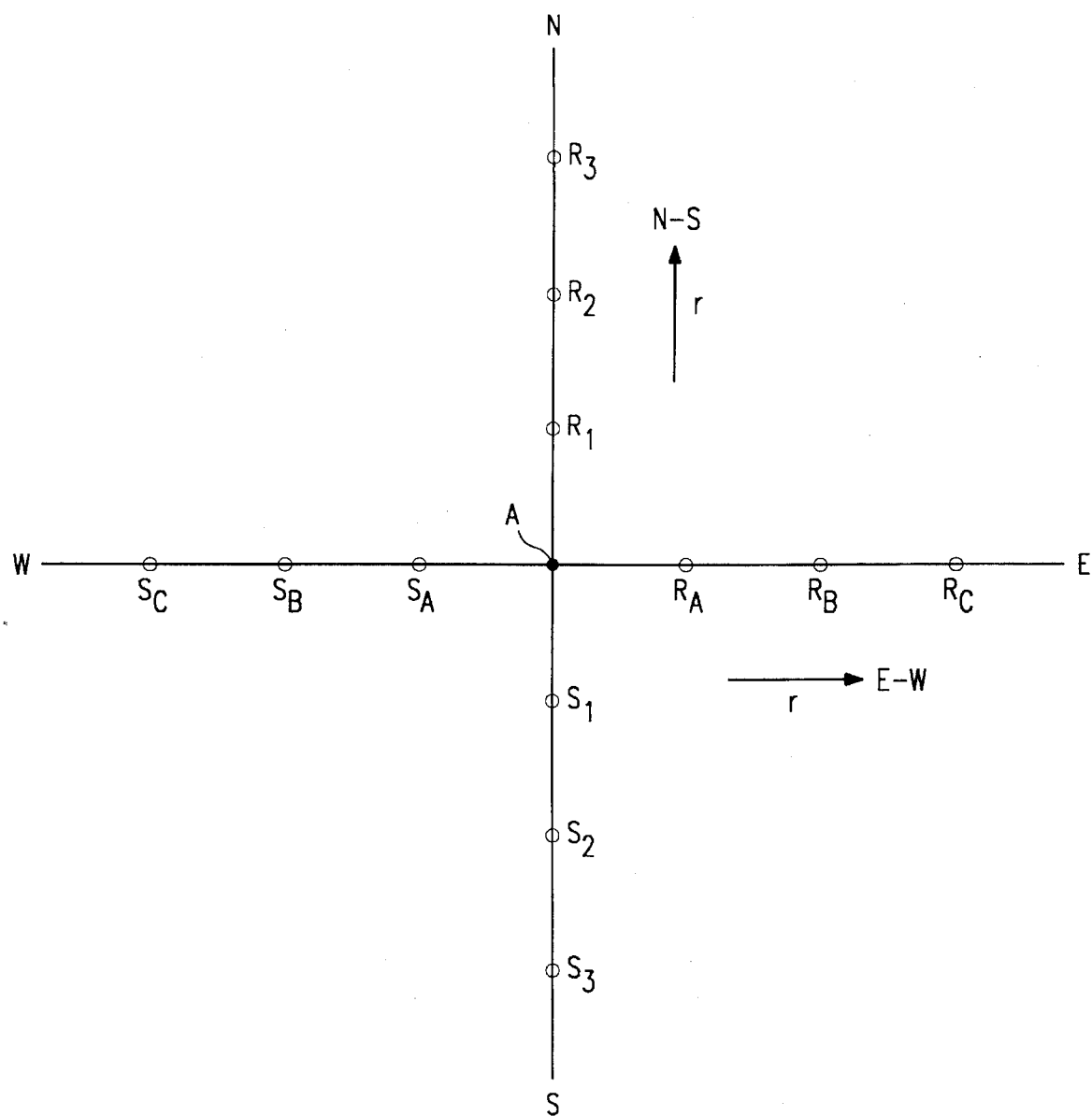
FIG. 1 shows a map view of an array of seismic sources and receivers for the acquisition of three dimensional seismic data over a surface area of the earth.

FIGS. 1 shows a map view of an array of seismic sources and receivers for the acquisition of three dimensional seismic data over a surface area of the earth. While one very basic array having orthogonal components is shown, any array or technique which results in the gathering of data rich in source receiver azimuths which are well known in the art may be used.

Referring again to FIG. 1, seismic sources $S_A$, $S_B$ and $S_C$ impart seismic energy into the earth along an east-west axis through a common midpoint A. Reflected signals are received, respectively, at seismic receivers $R_A$, $R_B$ and $R_C$ along the east-west axis. Seismic sources $S_1$, $S_2$ and $S_3$ are located the north-south axis and transmit seismic energy into the earth then through common midpoint A. Reflected seismic energy is received, respectively, by seismic receivers $R_1$, $R_2$ and $R_3$ along the north-south axis. The distances between sources and receivers is defined as r.

The sources used in this technique are well known in the art and include dynamite, vibrator, impulse or any other type of source which imparts energy into the earth's crust. The receivers used in this technique are well known in the art and include simple geophones as well as three component geophones or any other type of receiver capable of receiving reflected energy from the earth's crust.

A north-south and east-west axis are shown for simplicity of illustration. However, the array of seismic sources and receivers may be any of a number of arrays, both on land or in a marine environment which yield 3D seismic data. In addition, the trace azimuths need not be orthogonal and can be at any one of a number of angles.

By way of example, when seismic energy is imparted into the ground from a source, the time of receipt of the signals from source A (B and C) reflected through common midpoint A and received at $R_A$ ($R_B$ and $R_C$) is a function of the distance from source A to $R_A$, B to $R_B$ and C to $R_C$. The time of receipt of the signal at each of the receivers is conventionally provided by the following function.

$$T^2 = T_0^2 + \frac{r^2}{v^2}$$

where T equals the offset dependent travel time, $T_0$ equals the 0 offset travel time, r equals the source receiver offset and v is the so-called normal moveout velocity.

Figure 2:
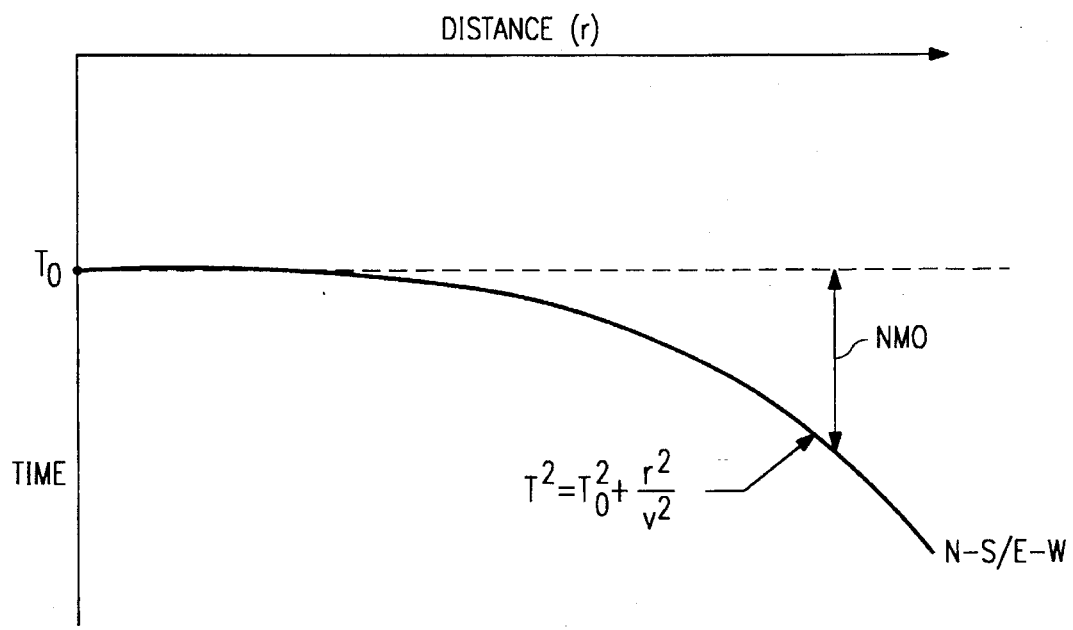
FIG. 2 shows the results of the application of the normal moveout equation to a gather of traces on the north-south and east-west trace azimuths in an azimuthally isotropic subsurface.

FIG. 2 shows the results of the application of this equation to a gather of traces on the north-south (N-S) and east-west (E-W) trace azimuths in an azimuthally isotropic subsurface for an array as shown in FIG. 1. The distance r, source receiver offset, is also displayed on FIG. 1.

Figure 3:
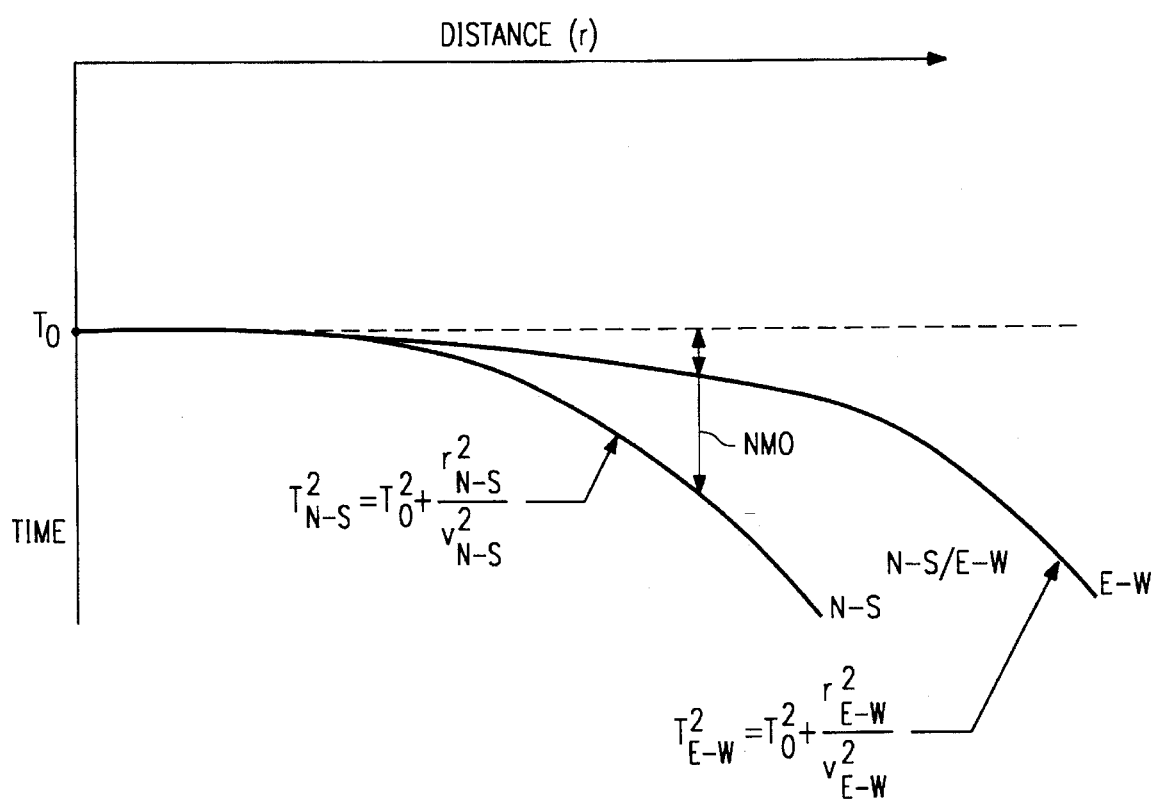
FIG. 3 shows the relationship between the source receiver offset and the offset dependent travel time for north/south (N-S) and east/west (E-W) trace azimuths for the array shown in FIG. 1 in the case of an azimuthally anisotropic subsurface volume beneath the array shown in FIG. 1.

FIG. 3 shows the relationship between the source receiver offset and the offset dependent travel time for north/south (N-S) and east/west (E-W) trace azimuths for the array shown in FIG. 1 in the case of an azimuthally anisotropic subsurface volume beneath the array shown in FIG. 1. The affect of azimuthal anisotropy is to change the velocity as a function of the direction and degree of anisotropy. Thus, $T^2_{ns}$ is the offset dependent travel time for the north-south set of source and receiver pairs, while $T^2_{ew}$ is the offset dependent travel time for the east-west set of source receiver pairs. In practice, the curve shown in FIGS. 2 and 3 represent the seismic reflection through a common midpoint. Therefore, in order to obtain the maximum signal to noise ratio for that particular reflection, the seismic reflected traces for north-south and east-west trace azimuths need to be added properly as is well known in the art.

Figure 4:
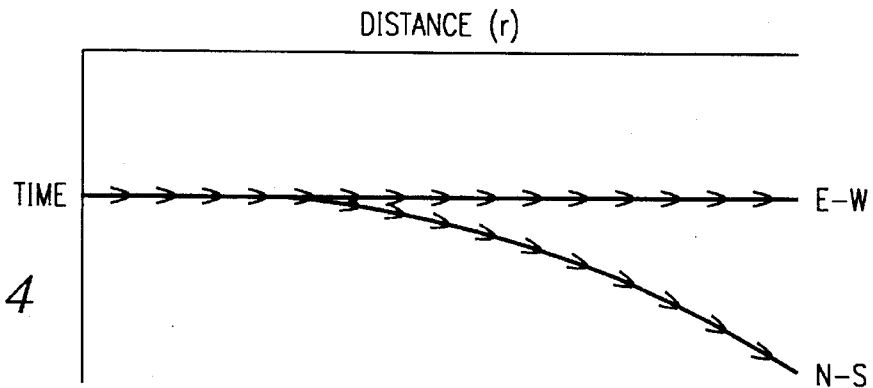
FIG. 4 shows a graphical representation of the traces contributing to the stack for two different trace azimuths in the case where there is azimuthal anisotropy.

FIG. 4 shows a graphical representation of the traces contributing to the stack for two different trace azimuths in the case where there is azimuthal anisotropy. Correcting the north-south and east-west trace azimuths using the same normal moveout correction in an area in which there is azimuthal anisotropy leads to the divergence of seismic reflection events along the north-south and east-west lines which can cause some cancellation and reduction in amplitude of the stack due to the improper accounting for the azimuthal anisotropy of the earth. In essence, this shows isotropic correction of signals in the presence of azimuthal anisotropy.

Figure 5:
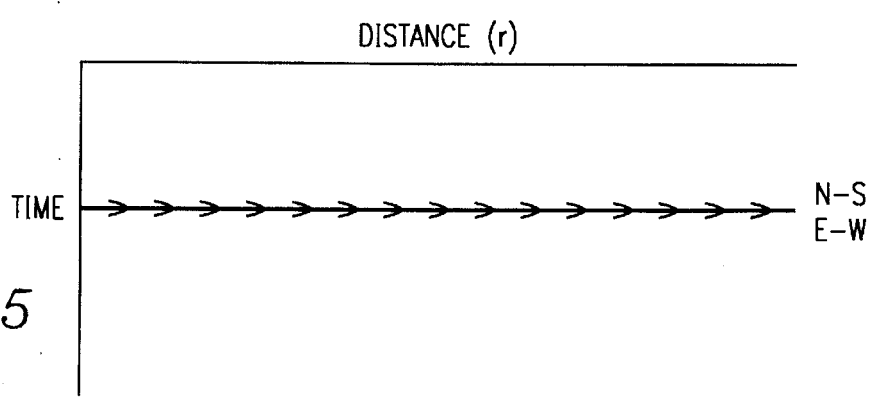
FIG. 5 shows a graphical representation of the traces contributing to the stack for two different trace azimuths in the case where there is azimuthal anisotropy properly accounting for the azimuthal anisotropy.

FIG. 5 shows a graphical representation of the stacking of two gathers of seismic traces properly accounting for the azimuthal anisotropy. This proper correction of reflected seismic events aligns both the signals from the north-south and east-west trace azimuths to yield a signal-to-noise ratio maximum.

In order to properly account for the effects of azimuthal anisotropy in an approximately horizontally layered media, the travel time correction for a collection of midpoint traces becomes $$T^2 = T_0^2 + \frac{r^2}{v^2} [1 - \epsilon \cos 2(\phi - \eta)]$$

where:

T=offset dependent travel time;

$T_o$=zero offset travel time;

r=the source receiver offset;

v=normal moveout correction;

$\epsilon$=degree of anisotropy;

$\phi$=preferred direction in the subsurface of the anisotropy; and $\eta$=the trace azimuth relative to true north.

The process described above for correcting seismic events yields stacked traces. Such stacked traces should, in theory, maximize the amount of energy in a single trace received from a seismic event occurring at a common midpoint. However, since the normal moveout correction used to stack the signals as shown in the above equation is a function of the degree of anisotropy ($\epsilon$) and the preferred direction of the azimuthal anisotropy ($\phi$), a trial and error process is used on each one of these variables alone in order to provide the maximum signal to noise ratio for the signal and determine the degree of anisotropy as well as the preferred direction of anisotropy.

Figure 6:
FIG. 6 shows a graph of the energy of stacked traces as a function of the degree of anisotropy for an anisotropic subsurface having a given angular direction of anisotropy.

FIG. 6 shows a graph of the energy of a stacked trace as a function of the degree of anisotropy for an anisotropic subsurface having a given angular direction of anisotropy. $\epsilon$ in the equation above is being varied and, as a result, the energy of the displayed seismic event is being adjusted by assuming various degrees of subsurface anisotropy. Referring again to FIG. 4, it can be seen that when the two trace azimuths are not properly corrected for the azimuthal anisotropy, seismic events are not aligned and cancellations yield less energy in the stacked trace. When the traces are more correctly combined accounting for azimuthal anisotropy using the equation shown above, the amount of energy in the stacked trace increases.

Figure 7:
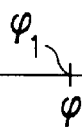
FIG. 7 shows the energy of stacked traces as a function of angular direction of anisotropy for a fixed degree of anisotropy.

FIG. 7 shows the energy of a stacked trace as a function of angular direction of anisotropy for a fixed degree of anisotropy. As can be seen, energy is a function of the assumed direction of azimuthal anisotropy. As the assumed and actual value of the direction of azimuthal anisotropy converge, the energy in the trace of the same seismic event from a common midpoint will be maximized.

Figure 8B:
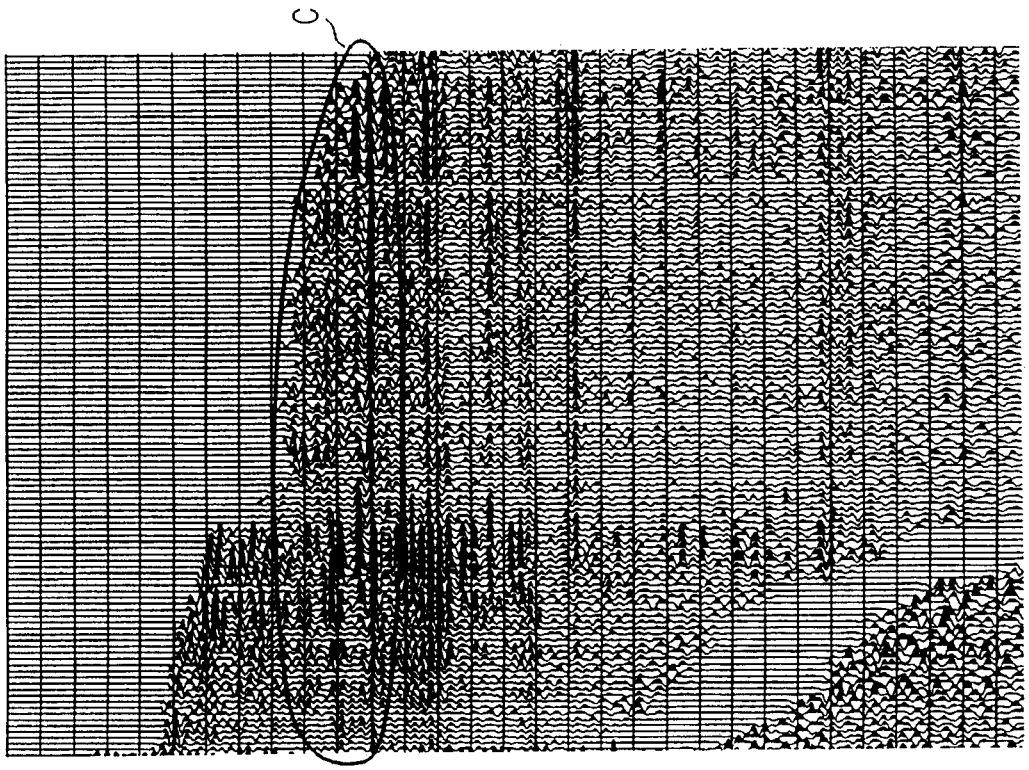
FIG. 8(b) is the same seismic gather shown in FIG. 8(a) with an anisotropic normal moveout correction.
Figure 8A:
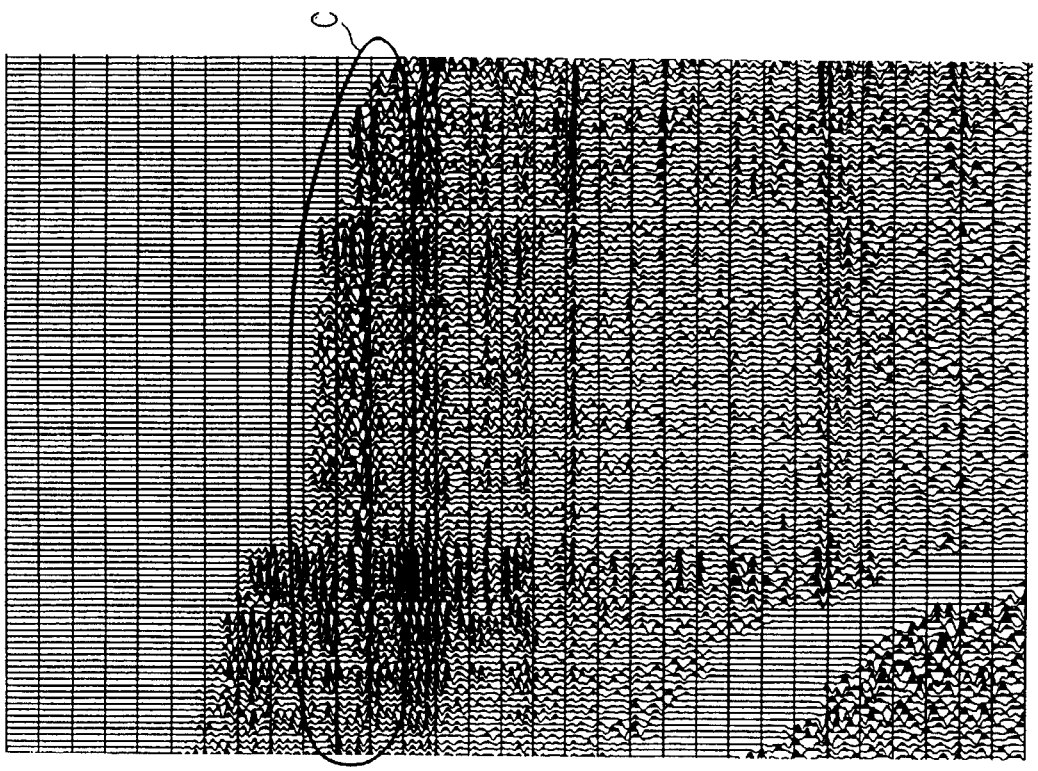
FIG. 8(a) is a portion of a seismic gather over a subsurface having azimuthal anisotropy with an isotropic normal moveout correction.

FIG. 8(a) shows a seismic gather for a region in which there exists azimuthal anisotropy which was corrected only to account for isotropic conditions. FIG. 8(b) shows the same gather data corrected for azimuthal anisotropy in the manner described above. As can be seen by referring to FIGS. 8(a) and 8(b) in region C, the seismic event shown in FIG. 8(a) is broken up and less well defined. However, when corrected for azimuthal anisotropy as shown if FIG. 8(a), the reflections from this seismic event become much more well defined.

Having thus described my invention by reference to its preferred embodiment, it is respectfully pointed out that embodiments described are illustrative rather than limiting, and that many variations and modifications are possible within the scope of the present invention. Many such variations and modifications may appear obvious and desirable to those skilled in the art based upon the foregoing description of the preferred embodiment.

I claim:

1. A method for improving the signal to noise ratio of a stacked trace of common midpoint seismic data obtained over a surface area having a plurality of trace azimuths, comprising:

a. selecting a first gather of traces along a first one of said plurality of trace azimuths;

b. selecting a second gather of traces along a second one of said plurality of trace azimuths;

c. assuming a plurality of degrees of anisotropy;

d. assuming a plurality of angular directions of the anisotropy;

e. stacking of said first and second gathers of traces in a manner which accounts for said anisotropy to produce a candidate stacked trace;

f. measuring the total energy of the candidate stacked trace for each one of said plurality of degrees of anisotropy to determine a degree of anisotropy for which the energy is a maximum; and g. measuring the total energy of the candidate stacked trace at the degree of anisotropy for which the total energy of the candidate stacked trace is a maximum for a plurality of angles for direction of anisotropy to determine the angle of anisotropy for which the energy is a maximum thereby maximizing the signal to noise ratio of the stack and determining the degree of and angular direction of azimuthal anisotropy.

2. The method of claim 1 wherein said stacking step accounts for the azimuthal anisotropy using the relative angular difference between the trace azimuths direction and the direction of the azimuthal anisotropy.

3. The methods of claim 1 wherein the angular direction of azimuthal anisotropy is determined using the following equation:

$$T^2 = T_0^2 + \frac{r^2}{v^2} [1 - \epsilon \cos 2(\phi - \eta)]$$

where:

T=offset dependent travel time $T_o$=zero offset travel time r=receiver offset distance v=normal moveout velocity $\epsilon$=measure of degree of azimuthal anisotropy $\phi$=preferred angular direction of azimuthal anisotropy in subsurface $\eta$=trace azimuth relation to true north.

4. The method of claim 1 wherein the steps of selecting, assuming, stacking and measuring are performed on a general purpose computer.

5. The method of claim 1 wherein steps f and g are performed simultaneously.

6. A method for improving the signal to noise ratio of a stacked trace of common midpoint seismic data obtained over a surface area having a plurality of trace azimuths, comprising:

a. selecting a first gather of traces along a first one of said plurality of trace azimuths;

b. selecting a second gather of traces along a second one of said plurality of trace azimuths;

c. assuming a plurality of degrees of anisotropy;

d. assuming a plurality of angular directions of the anisotropy;

e. stacking of said first and second gathers of traces in a manner which accounts for said anisotropy to produce a candidate stacked trace;

f. measuring the total energy of the candidate stacked trace for each one of said plurality of degrees of anisotropy and for a plurality of angles for direction of anisotropy to determine the angle and degree of anisotropy for which the energy is a maximum thereby maximizing the signal to noise ratio of the stack and determining the degree of and angular direction of azimuthal anisotropy.

7. The method of claim 6 wherein said stacking step accounts for the azimuthal anisotropy using the relative angular difference between the trace azimuths direction and the direction of the azimuthal anisotropy.

8. The methods of claim 6 wherein said angular direction of azimuthal anisotropy is determined using the following equation:

$$T^2 = T_0^2 + \frac{r^2}{v^2}[1 - \epsilon \cos 2(\phi - \eta)]$$

where:
- $T$=offset dependent travel time
- $T_o$=zero offset travel time
- $r$=receiver offset distance
- $v$=normal moveout velocity
- $\epsilon$=measure of degree of azimuthal anisotropy
- $\phi$=preferred angular direction of anisotropy in subsurface
- $\eta$ trace azimuth relation to true north.

9. The method of claim 6 wherein the steps of selecting, assuming, stacking and measuring are performed on a general purpose computer.

\* \* \* \* \*